(12) United States Patent
Kitano et al.

(10) Patent No.: US 9,321,621 B2
(45) Date of Patent: Apr. 26, 2016

(54) ASEPTIC FILLING SYSTEM

(75) Inventors: Koji Kitano, Osaka (JP); Takashi Harashima, Osaka (JP); Haruhiko Kondo, Osaka (JP); Yoshihiro Akiyama, Osaka (JP)

(73) Assignee: OTSUKA PHARMACEUTICAL CO., LTD., Tokyo (JP)

( * ) Notice: Subject to any disclaimer, the term of this patent is extended or adjusted under 35 U.S.C. 154(b) by 643 days.

(21) Appl. No.: 13/699,485

(22) PCT Filed: May 24, 2011

(86) PCT No.: PCT/JP2011/061907
§ 371 (c)(1),
(2), (4) Date: Nov. 21, 2012

(87) PCT Pub. No.: WO2011/148953
PCT Pub. Date: Dec. 1, 2011

(65) Prior Publication Data
US 2013/0061557 A1    Mar. 14, 2013

(30) Foreign Application Priority Data

May 25, 2010 (JP) .................................. 2010-119438

(51) Int. Cl.
*B65B 55/00* (2006.01)
*B67C 7/00* (2006.01)
(Continued)

(52) U.S. Cl.
CPC .............. *B67C 7/0073* (2013.01); *B29C 45/76* (2013.01); *B29C 49/06* (2013.01);
(Continued)

(58) Field of Classification Search
CPC .. B67C 7/0073; B67C 7/00; B67C 2003/227; B29C 45/76; B29C 49/06; B29C 49/4205; B29C 49/46; B29C 49/78; B29C 2049/4231; B29C 49/36; B29C 2049/4676; B29C 2049/4679; B29C 2049/4697; B29K 2067/003; B65B 55/00
USPC ............ 53/167, 281, 561, 525; 425/534, 150; 428/36.92; 198/571, 478.1, 575, 469.1, 198/470.1, 576, 577
See application file for complete search history.

(56) References Cited

U.S. PATENT DOCUMENTS 3,481,109 A    12/1969  Pavey
5,728,409 A     3/1998  Schad et al.
(Continued)

FOREIGN PATENT DOCUMENTS

CN         101513769 A      8/2009
DE   10 2008 057 403 A1    5/2010
(Continued)

OTHER PUBLICATIONS

English-language translation of the International Search Report from the Japanese Patent Office for International Application No. PCT/JP2011/061907, mailing date Jun. 28, 2011.
(Continued)

*Primary Examiner* — Hemant M Desai
*Assistant Examiner* — Valentin Neacsu
(74) *Attorney, Agent, or Firm* — Finnegan, Henderson, Farabow, Garrett & Dunner, L.L.P.

(57) ABSTRACT

Disclosed is an aseptic filling system which is disposed in an aseptic environment and with which preforming, bottle formation, and filling of bottles with a beverage are performed in an aseptic state. The aseptic filling system includes a preform molding machine, a blowing machine for forming bottles by blowing up the preforms molded by the preform molding machine, and a filling machine for filling the bottles formed by the blowing machine with the beverage.

18 Claims, 8 Drawing Sheets

(51) Int. Cl.
*B29C 45/76* (2006.01)
*B29C 49/06* (2006.01)
*B29C 49/46* (2006.01)
*B29C 49/78* (2006.01)
*B29C 49/42* (2006.01)
*B29K 67/00* (2006.01)
*B29C 49/36* (2006.01)
*B67C 3/22* (2006.01)

(52) U.S. Cl.
CPC ............ *B29C 49/4205* (2013.01); *B29C 49/46* (2013.01); *B29C 49/78* (2013.01); *B29C 49/36* (2013.01); *B29C 2049/4231* (2013.01); *B29C 2049/4676* (2013.01); *B29C 2049/4679* (2013.01); *B29C 2049/4697* (2013.01); *B29K 2067/003* (2013.01); *B67C 2003/227* (2013.01)

(56) References Cited

U.S. PATENT DOCUMENTS

| | | | |
|---|---|---|---|
| 5,968,429 A | 10/1999 | Treece et al. | |
| 6,119,433 A | 9/2000 | Kitahora et al. | |
| 6,637,480 B1* | 10/2003 | Tobin et al. | 141/387 |
| 2005/0029712 A1 | 2/2005 | Nahill et al. | |
| 2006/0068050 A1* | 3/2006 | Saito et al. | 425/145 |
| 2007/0001344 A1 | 1/2007 | Weinmann et al. | |
| 2007/0220835 A1 | 9/2007 | Till | |
| 2008/0290561 A1* | 11/2008 | Gaiser | 264/328.8 |
| 2009/0071104 A1* | 3/2009 | Fischer | 53/426 |
| 2009/0077933 A1* | 3/2009 | Backhaus et al. | 53/561 |
| 2009/0110613 A1* | 4/2009 | Naka et al. | 422/186 |
| 2009/0208601 A1 | 8/2009 | Shimomura | |
| 2010/0011712 A1 | 1/2010 | Till | |
| 2011/0146202 A1 | 6/2011 | Imatani et al. | |
| 2011/0219728 A1 | 9/2011 | Humele | |

FOREIGN PATENT DOCUMENTS

| | | |
|---|---|---|
| EP | 0 813 949 A1 | 12/1997 |
| EP | 1 837 157 A2 | 9/2007 |
| EP | 1 640 135 B1 | 3/2008 |
| EP | 2 324 987 A1 | 5/2011 |
| JP | 09-039110 | 2/1997 |
| JP | 10-167226 | 6/1998 |
| JP | 11-291331 | 10/1999 |
| JP | 2003-237936 | 8/2003 |
| WO | WO 98/47770 | 10/1998 |
| WO | WO 2010/024165 A1 | 3/2010 |

OTHER PUBLICATIONS

The International Bureau of WIPO, "International Preliminary Report on Patentabiiity," PCT/JP2011/061907, Nov. 27, 2012, 7 pages.

Search Report for CN Office Action in CN Patent Application No. 201180025524.0 dated Feb. 17, 2015.

Extended European Search Report for EP Application No. 11786652.5 dated Apr. 23, 2015.

* cited by examiner

ASEPTIC FILLING SYSTEM

TECHNICAL FIELD

The present invention relates to an aseptic filling system and, to be more detailed, a system with which a step of molding a raw material resin to mold bottles to a step of filling the bottles with a beverage are performed in an aseptic environment and further after being filled with the beverage, bottle interiors are sealed while being maintained at a positive pressure.

BACKGROUND ART

Plastic-bottled refreshing beverages (sports drinks, mineral water, black tea, carbonated beverages, etc.) have been increasing recently. A plastic-bottled refreshing beverage is manufactured, for example, by molding PET or other raw material resin to form a bottle, filling the bottle with the beverage, and sealing the bottle by capping. Such a manufacture line must be controlled in an aseptic state because beverages consumed by people and bottles that contact mouths of people are handled in the line.

For example, there is known an aseptic filling equipment for plastic bottles that includes a continuous preform/bottle molding machine integrally including a preform molding machine and a bottle molding machine and performing a step of molding pellet resin to preforms and a step of blowing up and thereby molding the preforms to bottles in a continuous manner, an aseptic air conveyor conveying the bottles to a filling step, and a filling apparatus installed at a terminal end of the aseptic air conveyor (see, for example, Patent Document 1).

CITATION LIST

Patent Document

Patent Document 1: Japanese Published Unexamined Patent Application No. Hei 10-167226

SUMMARY OF THE INVENTION

Technical Problem

The present inventors have been conducting studies to achieve the four objects of (1) improvement in product quality (realizing a thoroughly aseptic state), (2) improvement in worker safety, (3) reduction in manufacturing cost, and (4) reduction in environmental burdens in a manufacturing line for a plastic-bottled refreshing beverage that is controlled in an aseptic state as described above.

With the equipment (system) of Patent Document 1, the pellet resin is molded to the final shapes of bottles at once by the continuous preform/bottle molding machine installed at an upstream side of the line and the bottles are conveyed as they are in the bottle shapes to the filling apparatus by the air conveyor. A long air conveyor capable of lining up the bottles that have been blown up largely must thus be installed and a large plant in which installation space for such an air conveyor can be secured is required. The (3) manufacturing cost (equipment cost) is thus high.

Also, when the filling apparatus of the post-process, etc., stops temporarily due to some problem and transfer of bottles from the air conveyor to the filling apparatus is disabled, the bottles unloaded from the molding machine begin to pile up on the air conveyor and finally, stoppage of the molding machine becomes inevitable. Likewise, in an opposite case where the molding machine, etc., stops temporarily, stoppage of the filling apparatus, etc., becomes inevitable. The system is thus inefficient because even when one of the apparatuses making up the system stops temporarily due to a problem, the other apparatuses are affected and the entire system must be stopped consequently. Also, when operation of the system is resumed, product quality may vary before and after resumption of operation and (1) product quality may not be maintained.

It is also difficult to say that (2) improvement in worker safety and (4) reduction in environmental burdens can be achieved adequately in a manufacturing line for a plastic-bottled refreshing beverage by the equipment of Patent Document 1.

An object of the present invention is to provide an aseptic filling system capable of achieving the four objects of (1) improvement in product quality (realization of a thoroughly aseptic state), (2) improvement in worker safety, (3) reduction in manufacturing cost, and (4) reduction in environmental burdens in a manufacturing line for a plastic-bottled refreshing beverage.

Solution to Problem

A first aspect of the present invention provides an aseptic filling system disposed in an aseptic environment and performing molding of preforms, bottle forming, and filling of bottles with a beverage in an aseptic state, the aseptic filling system including a preform molding machine, a blowing machine for forming bottles by blowing up the preforms molded by the preform molding machine, and a filling machine integrated with the blowing machine by a specific coupling structure for filling the bottles formed by the blowing machine with the beverage.

A second aspect of the present invention provides an aseptic filling system disposed in an aseptic environment and performing molding of preforms, bottle forming, and filling of bottles with a beverage in an aseptic state, the aseptic filling system including a preform molding machine, a preform buffer for temporarily storing the preforms molded by the preform molding machine, a blowing machine for forming bottles by blowing up the preforms, and a filling machine integrated with the blowing machine by a specific coupling structure for filling the bottles formed by the blowing machine with the beverage.

A third aspect of the present invention provides the aseptic filling system according to the first or second aspect, where the preform molding machine includes an injection molding machine that performs batch-wise injection molding while melting a resin continuously, the injection molding machine includes molds including at least partite members that are closed during injection molding and opened up when taking out the preforms and a removing unit removing and unloading the preforms attached to one of the molds to a predetermined position when the molds are opened, and the molds and the removing unit are disposed inside an aseptic environment meeting predetermined conditions.

A fourth aspect of the present invention provides the aseptic filling system according to the third aspect, where at a start of injection molding by the injection molding machine, the batch-wise injection molding is performed just a predetermined number of times to form the preforms and the molded preforms are taken out by the removing unit and unloaded out of the aseptic environment meeting predetermined conditions.

A fifth aspect of the present invention provides the aseptic filling system according to the second aspect, where the preform molding machine includes an injection molding machine that performs batch-wise injection molding while melting a resin continuously, the injection molding machine includes molds including at least bipartite members that are closed during injection molding and opened when taking out the preforms and a removing unit removing and unloading the preforms attached to one of the molds to a predetermined position when the molds are opened, and a conveying path is provided at the predetermined position to which the removing unit removes and unloads, the conveying path successively conveys the preforms to the preform buffer, and the preforms are cooled by air while being conveyed.

A sixth aspect of the present invention provides the aseptic filling system according to the second or fifth aspect, where the preform buffer is set to a capacity for temporarily storing the preforms supplied to the blowing machine in filling the bottles manufactured by the system with the beverage.

A seventh aspect of the present invention provides the aseptic filling system according to the sixth aspect, where the preform buffer includes a buffer tank for storing a predetermined number (predetermined amount) of the preforms.

An eighth aspect of the present invention provides the aseptic filling system according to the sixth aspect, where the preform buffer includes a buffering belt for placement and conveying of a predetermined number (predetermined amount) of the preforms.

A ninth aspect of the present invention provides the aseptic filling system according to any one of the second and fifth to eighths aspects, further including a detecting unit detecting an amount or a number of the preforms temporarily stored in the preform buffer, and a molding rate controlling unit adjusting a molding rate of the preform molding machine based on the amount or the number of the preforms detected by the detecting unit.

A tenth aspect of the present invention provides the aseptic filling system according to any one of the second and fifth to ninth aspects, further including an aseptic conveying unit disposed between the preform buffer and the blowing machine and conveying the preforms, unloaded from the preform buffer, to the blowing machine.

An eleventh aspect of the present invention provides the aseptic filling system according to any one of the first to tenth aspects, where the blowing machine includes an oven for heating the conveyed preforms to a predetermined temperature, and a bottle-forming mechanism blowing up and forming the preforms heated by the oven into bottles.

A twelfth aspect of the present invention provides the aseptic filling system according to any one of the first to eleventh aspects, where the specific coupling structure integrating the blowing machine and the filling machine includes a plurality of star wheels that are rotatable and capable of holding the bottles at a circumferential portion thereof, and the bottles formed by the blowing machine are fed to the filling machine successively via the plurality of star wheels.

A thirteenth aspect of the present invention provides the aseptic filling system according to the twelfth aspect, where the specific coupling structure includes an unloading star wheel for taking out the bottles formed by the blowing machine, and a filling star wheel for supplying the bottles to the filling machine, a delivering star wheel for delivering the bottles, held by the unloading star wheel, to the filling star wheel is disposed between the unloading star wheel and the filling star wheel, and the delivering star wheel can be changed in position to an operating state of engaging with the unloading star wheel and the filling star wheel and to a retreated state of temporarily being able to block an interval between the unloading star wheel and the filling star wheel by moving away from at least any of the wheels.

A fourteenth aspect of the present invention provides the aseptic filling system according to the thirteenth aspect, further including a shutter unit temporarily closing a communicating path between the blowing machine and the filling machine when the delivering star wheel is in the retreated state, and where in the state where the shutter unit is closed, the blowing machine side can be sterilized/disinfected in a dry state, and the filling machine side can be sterilized/disinfected using a wet method.

A fifteenth aspect of the present invention provides the aseptic filling system according to any one of the first to fourteenth aspects, where the preform molding machine, the blowing machine, and the filling machine are covered by a clean booth that demarcates an aseptic environment in its interior, and the interior of the clean booth is set at a positive pressure higher in air pressure than an exterior of the clean booth.

A sixteenth aspect of the present invention provides the aseptic filling system according to any one of the second to fifteen aspects, where the preform buffer is also covered with a clean booth in communication with the clean booth, and the interior of the clean booth is set at a positive pressure higher in air pressure than an exterior of the clean booth.

A seventeenth aspect of the present invention provides the aseptic filling system according to the fifteenth or sixteenth aspect, where the clean booth covering the respective equipments has, on an upper surface thereof, a fan for sucking in air from the exterior of the clean booth and has HEPA filters or ULPA filters aligned at predetermined intervals and filtering the air sucked in by the fan, and the clean booth has, on a lower surface side thereof, an exhaust window through which the air inside the clean booth is exhausted.

An eighteenth aspect of the present invention provides the aseptic filling system according to the seventeenth aspect, where the clean booth (entire system) covering the respective equipment is further disposed inside an aseptic environment of a predetermined degree of cleanness.

Effect(s) of the Invention

With the invention of the first aspect, a step of molding the preforms, a step of forming the preforms into bottles, and a step of filling the bottles with the beverage are all performed in the aseptic environment. Moreover, the blowing machine and the filling machine are integrated by the coupling structure to enable the aseptic state to be maintained satisfactorily between the blowing machine and the filling machine so that chemical sterilization/disinfection of the bottles before beverage filling does not have to be performed or can be performed at a reduced usage amount of chemical. Amounts of exposure of the product (bottled beverage) to germs and chemicals can thus be reduced. Consequently, (1) improvement in product (bottled beverage) is made possible.

Also, (2) improvement in worker safety is made possible because a chemical for sterilization/disinfection does not have to be used or the usage amount thereof can be reduced. Also, (4) reduction in environmental burdens can be achieved because an amount of waste (chemical) can be reduced in accordance with nonuse or reduction in usage amount of the chemical.

Also, by the blowing machine and the filling machine being integrated, a manufacturing line can be made compact and installation space of the system can be reduced. Consequently, (3) reduction in manufacturing cost (equipment cost)

can be achieved. Further, the system is compact and thus the aseptic states of the system as a whole and the respective apparatuses can be managed easily.

With the second aspect of the invention, the step of molding the preforms, the step of forming the preforms to bottles, and the step of filling the bottles with the beverage are performed throughout in the aseptic environment as in the first aspect of the invention. Moreover, the blowing machine and the filling machine are integrated by the coupling structure to enable the aseptic state to be maintained satisfactorily between the blowing machine and the filling machine so that chemical sterilization/disinfection of the bottles before beverage filling does not have to be performed or can be performed at a reduced usage amount of chemical. Amounts of exposure of the products (bottled beverages) to germs and chemicals can thus be reduced. Consequently, (1) improvement in product (bottled beverage) quality is made possible.

Also, (2) improvement in worker safety is made possible because the chemical for sterilization/disinfection does not have to be used or the usage amount thereof can be reduced. Also, (4) reduction in environmental burdens can be achieved because the amount of waste (chemical) can be reduced in accordance with nonuse or reduction in usage amount of the chemical.

Also, by the blowing machine and the filling machine being integrated, the manufacturing line can be made compact and installation space of the system can be reduced. Consequently, (3) reduction in manufacturing cost (equipment cost) can be achieved. Further, the system is compact and thus the aseptic states of the system as a whole and the respective apparatuses can be managed easily.

Further, with the second aspect of the invention, even if the preform molding machine stops temporarily due to some problem, etc., the preforms stored in the preform buffer can be conveyed to continue the aseptic filling without stopping the blowing machine and the filling machine.

Also, even when the post-process (blowing machine and/or filling machine) stops temporarily due to some problem, etc., the preforms unloaded from the preform molding machine can be stored temporarily in the preform buffer. Operation of the preform molding machine can thus be continued without stopping, even while the apparatuses of the post-process are stopped temporarily. When the preform molding machine is stopped temporarily, the molded preforms (resin) may degrade due to scorching, etc. By providing the preform buffer, the need to stop the preform molding machine is eliminated while the buffer is able to store the preforms even when the post-process stops temporarily due to a problem and improvement in operation rate can thus be achieved. Further, satisfactory quality can be maintained because the preform molding machine does not have to be stopped.

Moreover, the temporarily stored objects are not the bottles but the preforms and thus an adequate effect can be achieved even with a compact buffer, and without an increase in equipment cost.

Also, by continuous operation of the preform molding machine, the quality of the preforms can be kept uniform and it is thus easy to maintain the quality of the product (PET-bottled beverage). Further, a number of times of restarting of the molding machine are decreased and thus a number of times of discarding (trial run) of the preforms of degraded resin can be reduced. Waste resulting from the trial run can consequently be reduced to enable reduction in environmental burdens.

With the third aspect of the invention, the molded preforms can be taken out in an automated manner without manual intervention and the aseptic environment of the system can thus be maintained satisfactorily.

With the fourth aspect of the invention, resin that has degraded inside the molds at the start of molding of the preforms can be purged in the preform state without manual intervention. The aseptic environment of the system can thus be maintained even more satisfactorily.

With the fifth aspect of the invention, the preforms are cooled and hardened during conveying so that deformation of the preforms can be prevented even when the preforms contact each other inside the preform buffer.

With the sixth aspect of the invention, even when the preform molding machine stops temporarily due to some problem, etc., the aseptic filling can be continued by conveying the preforms stored in the preform buffer without stopping the blowing machine and the filling machine.

As a specific example of the preform buffer, an arrangement that includes a buffer tank as in the seventh or eighth aspect is possible or an arrangement that includes a buffering belt is possible. Alternatively, a combination of these arrangements is also possible.

With the ninth aspect of the invention, when the amount or number of preforms is in an increasing trend, the molding rate of the preform molding machine can be slowed down to decrease the preform molding quantity and, on the other hand, when the amount or number of preforms is in a decreasing trend, the molding rate of the preform molding machine can be quickened to increase the preform molding quantity to thereby maintain the amount of preforms stored in the preform buffer at a suitable amount. That is, the preforms in the buffer tank can be issued continuously without having to stop the preform molding machine. Also, the preforms are not retained inside the buffer tank for a long time and the quality and aseptic property of the preforms can thus be improved further.

Further, the molding rate of the preform molding machine can be slowed down to extend a fill-up time of the buffer tank, thereby enabling a number of times of stoppage of the preform molding machine to be decreased. Also, the buffer tank can be made small in size.

With the tenth aspect of the invention, degrees of freedom of layout of the preform molding machine and the preform buffer and layout of the blowing machine and the filling machine are increased by disposing the aseptic conveying unit between the preform buffer and the blowing machine.

Also, by adjusting a conveying rate of the aseptic conveying unit, a supplying rate (conveying rate) of the preforms to the blowing machine can be stabilized to enable the preforms to be formed satisfactorily into bottles at the blowing machine.

The aseptic conveying unit may be arranged using a belt conveyor having projections (latching projections) at fixed intervals for latching the preforms.

During conveying by the belt conveyor, the preforms may be aligned so that the preforms can be supplied in a fixed orientation and at fixed intervals to the blowing machine.

With the twelfth aspect of the invention, the transfer of bottles from the blowing machine to the filling machine can be performed reliably and efficiently by use of the plurality of star wheels. Also, an arrangement for coupling and integrating the blowing machine and the filling machine can be realized in a space-saving manner and yet with a high degree of freedom of design.

With the thirteenth and fourteenth aspects of the invention, the interior of the aseptic environment in which the system is installed can be sterilized/disinfected satisfactorily and put in the aseptic state.

With the fifteenth and sixteenth aspect of the invention, mixing in of germs and dust into the clean booth can be prevented because the interior of the clean booth is set at a positive pressure relative to the exterior of the clean booth. Consequently, the aseptic states of the preform molding machine, the preform buffer, the blowing machine, and the filling machine in the clean booth can be maintained satisfactorily.

With the seventeenth aspect of the invention, even if germs and dust become mixed inside the clean booth when a worker enters or exits the clean booth, etc., the aseptic state of the interior of the case can be maintained satisfactorily by circulating the air between the clean booth interior and the clean booth exterior while filtering with a HEPA filter or an ULPA filter.

With the eighteenth aspect of the invention, surroundings of the respective clean booths are maintained as aseptic environments and thus clean air can be circulated between the clean booth interior and the clean booth exterior while filtering with an HEPA filter or an ULPA filter.

DESCRIPTION OF EMBODIMENTS

Embodiments of the present invention shall now be described in detail with reference to the attached drawings.
<Overall Arrangement of Aseptic Filling System>

Figure 1:
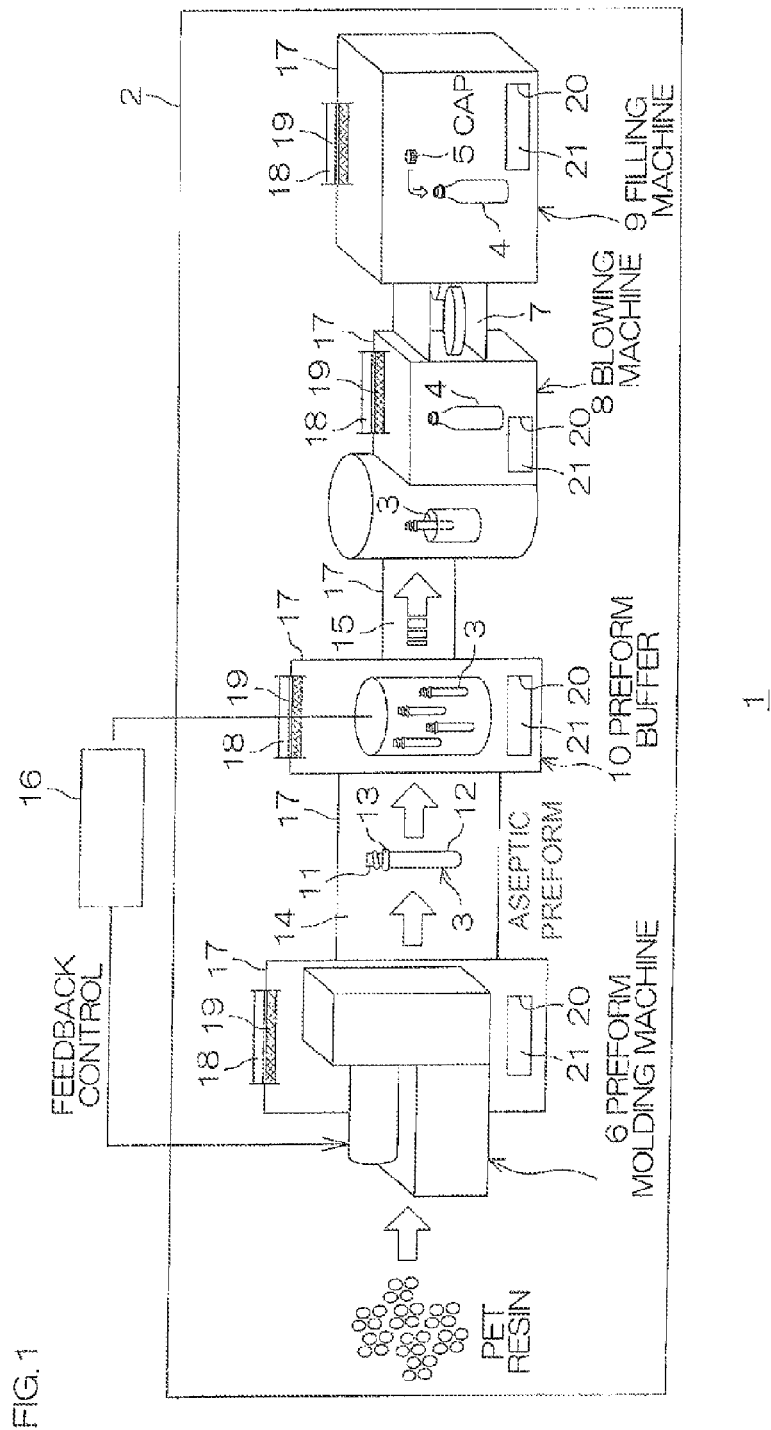
FIG. 1 is a schematic arrangement diagram of an aseptic filling system according to an embodiment of the present invention.

FIG. 1 is a schematic arrangement diagram of an aseptic filling system according to a first embodiment of the present invention.

The aseptic filling system 1 is installed inside a clean room 2 with an aseptic environment that is maintained in degree of cleanness by equipment corresponding to ISO Class 4 (with an allowable concentration of particles of 0.1 µm diameter of 10000 particles/ft$^3$) or ISO Class 5 (with an allowable concentration of particles of 0.1 µm diameter of 100000 particles/ft$^3$) and maintained at a room temperature of approximately 20° C. to 30° C.

Inside the clean room 2, the aseptic filling system 1 molds preforms 3 made of a PET resin raw material, blows up and thereby forms the preforms 3 into bottles 4, fills interiors of the bottles 4 with a beverage and liquid nitrogen (LN$_2$) and screws on caps 5 to manufacture a PET-bottled beverage.

The aseptic filling system 1 includes, in an order from an upstream side to a downstream side of a manufacturing a preform molding machine 6, and a blowing machine 8 and a filling machine 9 that are integrated via a specific coupling structure 7. Also in the present embodiment, a preform buffer 10 for temporarily storing the preforms 3 molded by the preform molding machine 6 is disposed between the preform molding machine 6 and the coupling/integrating equipment of the blowing machine 8 and the filling machine 9. Each preform 3 is made of PET resin of an amount necessary for forming a bottle and is a test-tube-like object that includes a threaded portion 11 on which the cap 5 is screwed, a trunk portion 12 that becomes a housing chamber of the bottle 4, and a flange-like neck portion 13 formed between the threaded portion 11 and the trunk portion 12.

The preform molding machine 6 and the preform buffer 10 are connected by a first conveying path 11 as a conveying path and the preform buffer 10 and the coupling/integrating equipment of the blowing machine 8 and the filling machine 9 are connected by a second conveying path 15 as an aseptic conveying unit. Transfer of the preforms 3 and the bottles 4 among a plurality of equipment can thereby be performed inside the clean room 2 and the aseptic manufacturing line capable of integrated production from PET resin to PET-bottled beverage (product) in an aseptic state is thereby arranged.

In the aseptic manufacturing line, the preform molding machine 6 and the preform buffer 10 are electrically connected to each other by a controller 16 as a molding rate controlling unit. In the present embodiment, the controller 16 adjusts a molding rate of the preform molding machine 6 based on an amount of preforms 3 temporarily stored in the preform buffer 10. Thus, by performing feedback control by the controller 16, the molding rate of the preform molding machine 6 can be slowed down to decrease a molding quantity of the preforms 3 when the amount of the preforms 3 is in an increasing trend, and on the other hand, the molding rate of the preform molding machine 6 can be quickened to increase the molding quantity of the preforms 3 when the amount of the preforms 3 is in a decreasing trend. The amount of preforms 3 stored in the preform buffer 10 can thereby be maintained at a suitable amount. That is, the preforms 3 inside a buffer tank (preform buffer 10) can be issued continuously without stopping the preform molding machine 6.

The aseptic manufacturing line is covered by a clean booth 17 that demarcates an aseptic environment having equipment of a higher degree of cleanness than the clean room 2 (for example, a degree of cleanness of ISO class 2 (with an allowable concentration of particles of 0.1 µm diameter of 100 particles/ft$^3$, hereinafter referred to as "class 100")). An interior of the clean booth 17 is set at a positive pressure higher in air pressure in comparison to an exterior of the clean booth 17 (in comparison to the interior of the clean room 2). Such a positive pressure environment can be arranged, for example, by introducing dust-removed air from the exterior of the clean booth 17 into the interior of the clean booth 17 and thereby filling the interior of the clean booth 17 with air. The clean booth 17 may be arranged, for example by assembling together aluminum plate members of suitable sizes. Such a clean booth 17 is arranged by integrally connecting cases covering the respective equipment, such as the preform molding machine 6, the preform buffer 10, the blowing machine 8, the filling machine 9, etc., and cases covering the conveying paths connecting the equipment.

On an upper surface of each of the cases covering the respective equipment, a fan 18 for sucking in air from outside the case and a filter 19 (HEPA filter or ULPA filter) for filtration of the air sucked in by the fan 18 are disposed. The fan 18 and the filter 19 are aligned across a predetermined interval with the fan 18 being disposed at an outer side and the filter 19 being disposed at an inner side. By operation of the fans 18 of the cases covering the preform molding machine 6, the preform buffer 10, the blowing machine 8, and the filling machine 9, dust-removed air that has been removed of dust by the filters 19 can be introduced from the exterior of the clean booth 17 into the interior of the clean booth 17.

Also, at a lower surface side of each of the cases covering the respective equipment, an exhaust window 20 is formed. The air inside the case is exhausted through the exhaust window 20. The exhaust window 20 has a lid 21 that includes, for example, a hinge mechanism and is disposed in a manner enabling opening and closing. For example, a worker can set the interior of the clean booth 17 at a positive pressure by closing the lids 21 to seal the clean room 2 and putting the fans 18 in operation in the state. On the other hand, a worker can perform ventilation for exhausting germs and dust inside the clean booth 17 to the exterior of the clean booth 17 by opening the lids 21 to partially open the clean booth 17 and putting the fans 18 in operation in the state to form flows of air in directions directed from the fans 18 to the exhaust windows 20 (directions directed from an upper side to a lower side).

Arrangements of the preform molding machine 6, the preform buffer 10, the blowing machine 8, and the filling machine 9 shall now be described and a PET-bottled beverage manufacturing process by the aseptic filling system 1 shall be described in order with reference to FIG. 2 to FIG. 6.

<Preform Molding Machine 6 and Preform Buffer 10>

Figure 2:
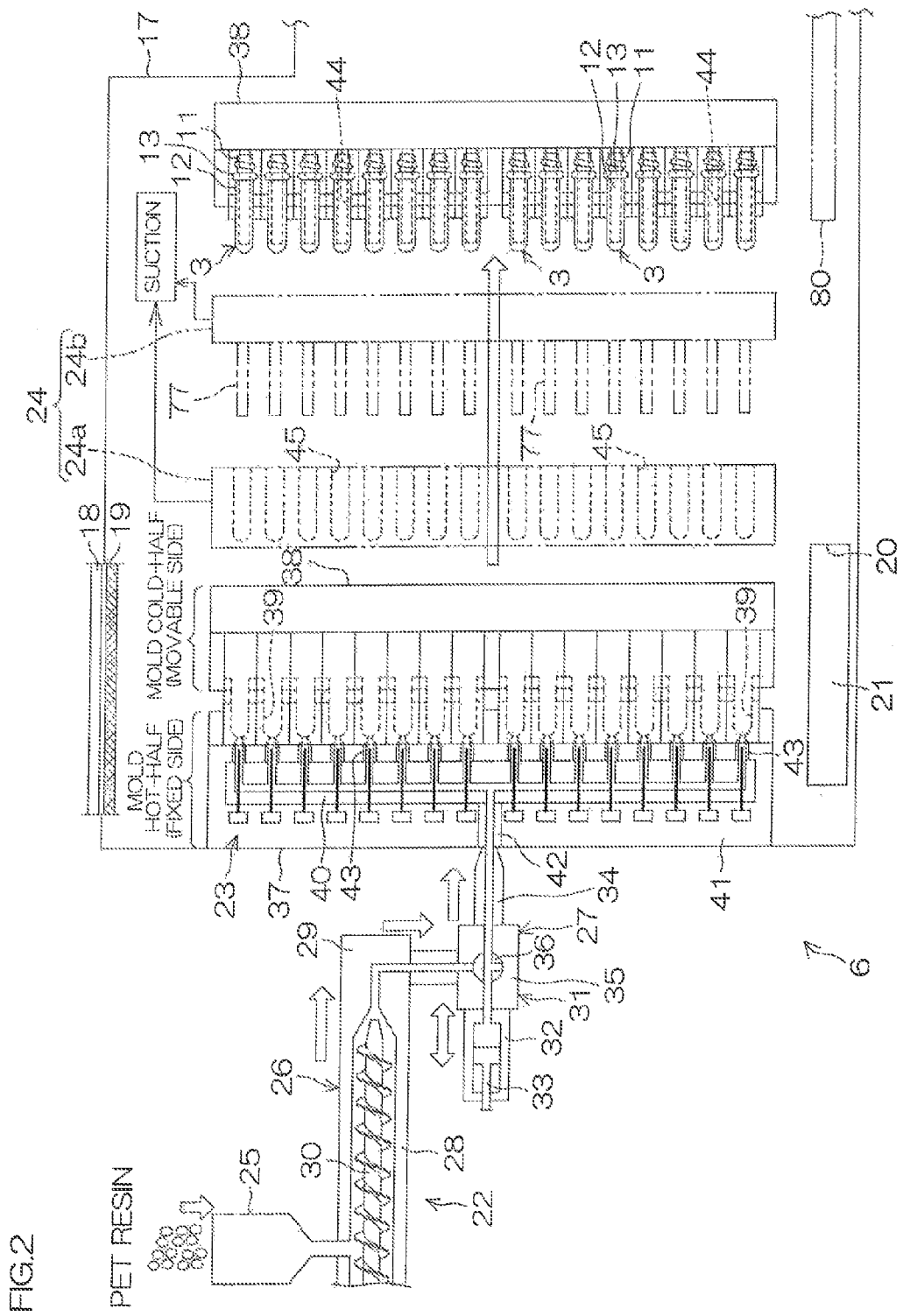
FIG. 2 is a schematic sectional side view of a preform molding machine and is a diagram for explaining a method for injection molding by the preform molding machine.
Figure 3:
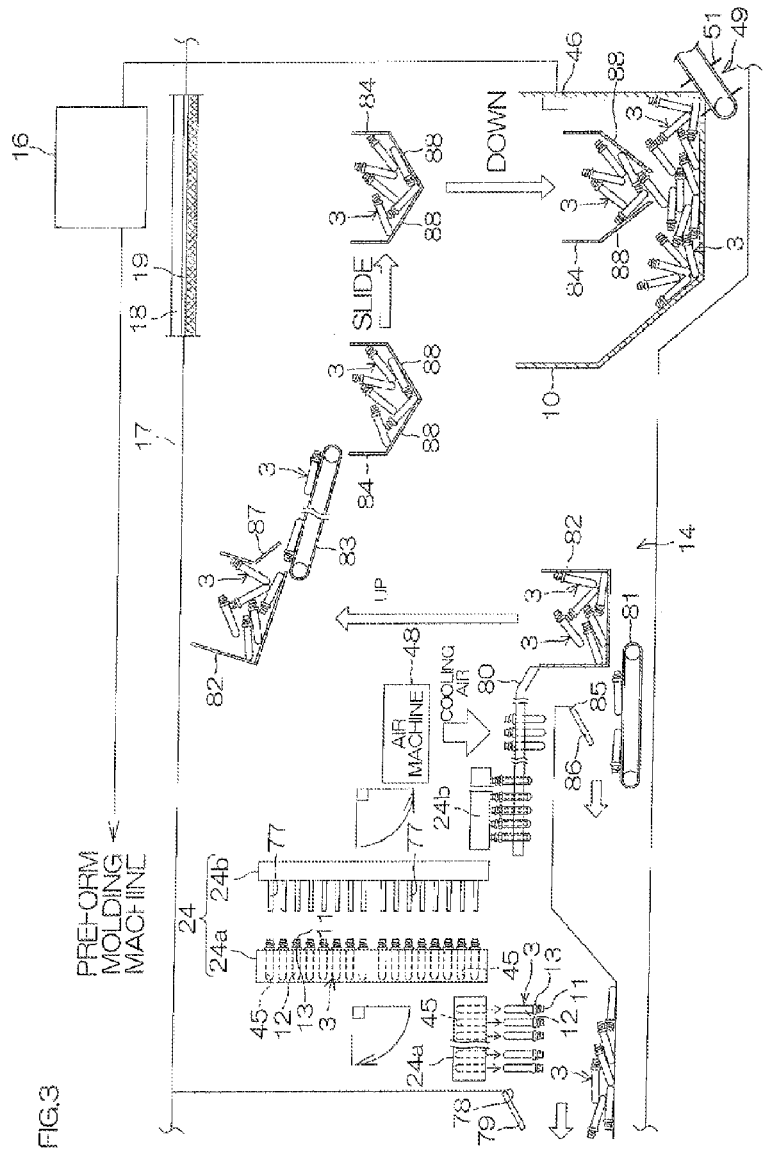
FIG. 3 is a schematic sectional side view of a suction apparatus and a preform buffer and is a diagram for explaining a flow of preforms between the preform molding machine and the preform buffer.
Figure 4:
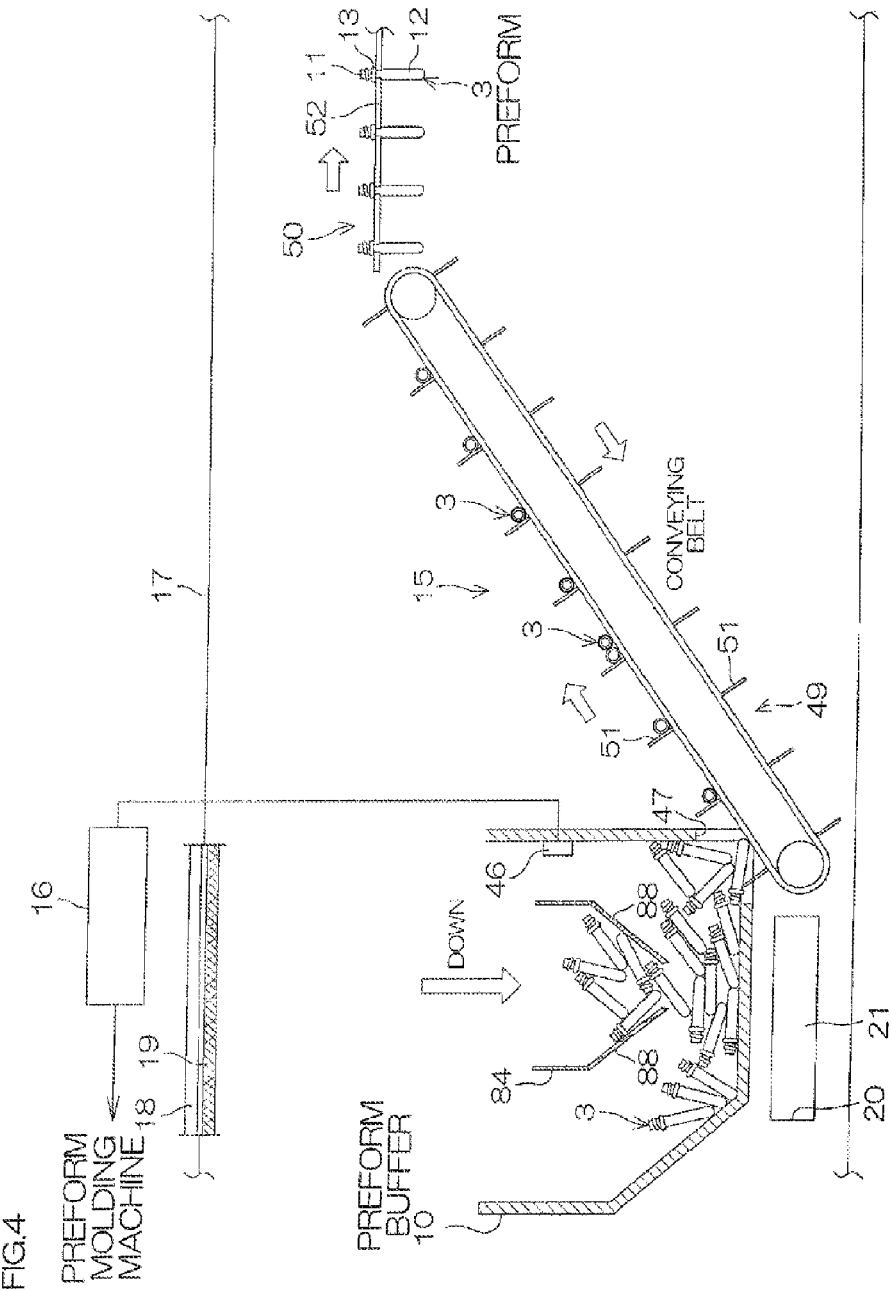
FIG. 4 is a schematic sectional side view of the preform buffer and is a diagram for explaining a flow of the preforms between the preform buffer and a blowing machine.

FIG. 2 is a schematic sectional side view of the preform molding machine and is a diagram for explaining a method for injection molding by the preform molding machine. FIG. 3 and FIG. 4 are schematic sectional side views of the preform buffer and are diagrams for explaining a flow of preforms between the preform molding machine and the preform buffer and between the preform buffer and the blowing machine.

In the present embodiment, the preform molding machine 6 is arranged from an injection molding machine that performs batch-wise injection molding while continuously melting a PET resin and includes a preform molding machine main unit 22, a mold 23, and a suction apparatus 24 as a removing unit.

The preform molding machine main unit 22 includes a hopper 25 into which the PET resin is loaded, a plasticizing apparatus 26 coupled to a lower end of the hopper 25, and an injecting apparatus 27 further coupled to a lower end of the plasticizing apparatus 26.

The plasticizing apparatus 26 includes a cylinder 28 having a tubular cavity in its interior and installed so that an axial direction of the cavity is parallel to a horizontal direction, a barrelhead 29 coupled to a front end portion of the cylinder 28 and by which molten resin fed in the horizontal direction (forward) from the cylinder 23 is fed in a gravity direction, and an extruder 30 (screw) disposed in the cavity in the interior of the cylinder 28 and being for transporting the molten resin from the cylinder 28 to the barrelhead 29. The cylinder 28 is provided with a heater (for example, a band heater, etc.) (not shown) for heating the cylinder 28.

The injecting apparatus 27 includes a distributor 31 coupled to the barrelhead 29 and by which the molten resin fed in the gravity direction from the barrelhead 29 is distributed in both front and rear directions parallel to the horizontal direction, a shooting pot 32 coupled to a rear end of the distributor 31 and having a cavity capable of temporarily storing the molten resin up to a predetermined amount in its interior, a piston 33 disposed in the cavity in the interior of the shooting pot 32 and being for feeding the stored molten resin forward, and a nozzle 34 coupled to a front end of the distributor 31 and by which the molten resin fed from the shooting pot 32 is injected in the horizontal direction (forward).

The distributor 31 includes a distributor main unit 35 having, in an interior thereof, three passages respectively connected to the barrelhead 29, the shooting pot 32, and the nozzle 34, and a valve mechanism 36 disposed at an intersection of the three passages, having a T-shaped passage in its interior, and capable putting in communication or blocking the T-shaped passage with respect to each of the three passages by rotating.

The mold 23 is disposed in front of the molding machine main unit 22 and is made up of a fixed mold 37 and a movable mold 38 that can be parted into two. In the present embodiment, for example, 128 cavities 39, corresponding to 128 preforms 3, are formed in the mold 23 in a state were the fixed mold 37 and the movable mold 38 are engaged, and 128 preforms can be formed at once in a single shot from the nozzle 34 of the molding machine main unit 22. The number of preforms 3 to be molded in a single shot can be changed by the mold.

The fixed mold 37 is fixed with respect to the plasticizing apparatus 26 of the molding machine main unit 22. The fixed mold 37 includes a manifold 41 having a hot runner 40 for making molten resin flow into its interior, a guide bushing 42 by which the molten resin injected from the nozzle 34 of the plasticizing apparatus 26 is guided to the manifold 41, and mold nozzles 43 disposed at a front surface of the manifold 41 and branching from the single hot runner 40 into a number corresponding to the number of the cavities 39. During injection molding, the hot runner 40 is heated and the fixed mold 37 is thereby controlled at a temperature that is relatively higher than that of the movable mold 38.

The movable mold 38 is installed in front of the fixed mold 37 in a manner enabling sliding in a direction (rear direction) of approaching the fixed mold 37 and a direction (front direction) of separating from the fixed mold 37. The movable mold 38 is displaceable to a mold-clamped state of engaging with the fixed mold 37 to form the cavities 39 during injection molding to enable the molding of the preforms 3 by filling with the molten resin and to a mold-open state of separating from the fixed mold 37 to enable the molded preforms 3 to be taken out. Also during injection molding, the movable mold 38 is controlled at a relatively low temperature. The movable mold 38 includes rod-like preform core molds 44 that are disposed one by one at positions facing the mold nozzles 43 of the fixed nozzles 37 and receive the molded preforms 3.

The suction apparatus 24 includes a releasing suction apparatus 24a by which the preforms 3 held by the preform core molds 44 are released from the preform core molds 44 and temporarily held by suction, and a receiving suction apparatus 24b receiving the preforms 3 from the releasing suction apparatus 24a by suction and sending the preforms 3 to a subsequent process.

The releasing suction apparatus 24a is formed to a disk-like shape having suction inlets 45 of a number corresponding to the number of preform core molds 44 on its front surface and is installed in a manner enabling sliding in a direction of approaching and a direction of separating from the mold 23. The respective suction inlets 45 are portions for holding the preforms 3 released from the preform core molds 44 and are respectively formed to recessed shapes capable of housing the trunk portions 12 of the preforms 3.

The releasing suction apparatus 24a is displaceable to an operating state of being disposed in a space between the fixed mold 37 and the movable mold 38 when the movable mold 38 is in the mold-open state and being capable of suctioning the preforms 3 from the movable mold 38 and to a retreated state of being moved away to a side of the mold 23 from the space and enabling mold clamping of the movable mold 38. Also as shown in FIG. 3, in the retreated state, the releasing suction apparatus 24a is enabled to rotate so that its front surface (open surfaces of the suction inlets 45) faces downward. By rotating the releasing suction apparatus 24a in the state where the preforms 3 are held in the suction inlets 45 to make the open surfaces of the suction inlets 45 face downward and thereafter releasing the suction by the releasing suction apparatus 24a, the preforms 3 can be made to drop by gravity.

The receiving suction apparatus 24h is formed to a disk-like shape and is installed in a manner enabling sliding in a direction of approaching and a direction of separating from the releasing suction apparatus 24a in the retreated state. Also, suction projections 77 of a number corresponding to the number of suction inlets 45 of the releasing suction apparatus 24a are disposed in a rearwardly projecting manner on a rear surface (surface facing the releasing suction apparatus 24a) of the receiving suction apparatus 24b. The respective suction projections 77 are portions that enter inside the trunk portions 12 of the preforms 3 in the state of being held in the suction inlets 45 and are respectively formed to rod-like shapes insertable into the trunk portions 12 of the preforms 3. Also as shown in FIG. 3, the receiving suction apparatus 24b is enabled to rotate so that its rear surface (surface on which the suction projections 77 are installed) faces downward. By rotating the receiving suction apparatus 24b in the state where the preforms 3 are held by the suction projections 77 to make the suction projections 77 face downward and thereafter releasing the suction by the receiving suction apparatus 24b, the preforms 3 can be sent to a subsequent process.

Also, the preform molding machine 6 is covered by the clean booth 17 in a manner such that the molding machine main unit 22 is disposed at an outer side and an interior thereof is held at a fixed temperature for example, 25° C.). Variation of temperature of the preforms 3 before being conveyed into the blowing machine 8 can thereby be lessened to enable bottles to be formed satisfactorily in the blowing machine 8. A preform discharging outlet 78 by which the preforms 3 that have dropped from the releasing suction apparatus 24a are discharged out of the clean booth 17 is formed at a lower portion of the clean booth 17. A lid 79, having, for example, a hinge mechanism, is disposed in a manner enabling opening and closing at the preform discharging outlet 78.

Referring to FIG. 3, the first conveying path 14 includes a multi-column conveyor 80, a discharging conveyor 81, a first bucket 82, a conveying conveyor 83, and a second bucket 84.

The multi-column conveyor 80 is installed below the receiving suction apparatus 24b, receives the preforms 3 from the receiving suction apparatus 24b, and aligns the received preforms 3 in plurality (16 preforms×8 columns in the present embodiment). The aligned preforms 3 are then conveyed successively and the preforms 3 are allocated between the discharging conveyor 81 and the first bucket 82 in accordance with a number of shots of the preform molding machine 6. A blower 48 is installed above the multi-column conveyor 80. The preforms 3 being conveyed are thereby cooled by cooling air and can be stored in the preform buffer 10 without becoming flawed.

The discharging conveyor 81 is a conveying path arranged from an endless belt conveyor and is for discharging the preforms 3 molded within a predetermined number of times of molding processes (batch processes) from a first molding process. The discharging conveyor 81 extends outside the clean booth 17 via a preform discharging outlet 85 formed at a lower portion of the clean booth 17. A lid 86, having, for example, a hinge mechanism, is disposed in a manner enabling opening and closing at the preform discharging outlet 85.

The first bucket 82 is arranged from a raised/lowered bucket and is raised and lowered freely in a vertical direction between a lowered position of receiving the preforms 3 from the multi-column conveyor 80 and a raised position of feeding the received preforms 3 to the conveying conveyor 83. The first bucket 82 has a capacity capable of housing a single shot (for example, 128) of preforms 3 at the lowered position. Also, an opening/closing lid 87 that opens and closes during feeding of the preforms 3 is disposed at a lower portion of the first bucket 82.

The conveying conveyor 83 is arranged from an endless belt conveyor and successively conveys the preforms 3, fed from the first bucket 82, to the second bucket 84.

The second bucket 84 is arranged from a sliding type raised/lowered bucket and is raised and lowered freely in the vertical direction between a raised, position of receiving the preforms 3 from the conveying conveyor 83 and a lowered position of feeding the received preforms 3 to the preform buffer 10. Also, at the raised position, the second bucket 84 is slidably movable between a vicinity of the conveying conveyor 83 and a position directly above the preform buffer 10. The second bucket 84 has a capacity capable of housing a single shot of (for example, 128) preforms 3 at the raised position. Also, a bottom wall of the second bucket 84 is arranged from two doors 88 and the doors 88 are arranged to open to respective sides from a center. By opening of the two doors 88, the preforms 3 in the second bucket 84 can be dropped by gravity.

Referring to FIG. 3 and FIG. 4, the preform buffer 10 is arranged from a buffer tank in which the preforms 3 received from the second bucket 84 are piled up randomly and stored. The preform buffer 10 has, for example, a capacity for temporarily storing the preforms 3 to be supplied to the blowing machine 8 while the bottles 4 made by the aseptic filling system 1 are being filled with the beverage. The preform molding machine 6 can thereby be made to operate continuously without stopping even when a post-process (the blowing machine 8, the filling machine 9, or other packaging equipment) stops temporarily due to some problem. Also, the preforms 3 stored in the preform buffer 10 can be conveyed to continue aseptic filling without stopping the blowing machine 8 and the filling machine 9 even when the preform molding machine 6 stops temporarily due to some problem.

As a detecting unit for detecting the amount of preforms 3 inside the tank (preform buffer 10), an amount detection sensor 46 is disposed at an upper portion of an inner wall of the preform buffer 10. The amount detection sensor 46 is electrically connected to the preform molding machine 6 via the controller 16.

A preform number detection sensor that measures a weight of the preforms inside the preform buffer 10 and converts the weight to a number of preforms may be disposed in place of the amount detection sensor 46. Alternatively, a sensor that detects a number A of the preforms 3 loaded into the preform buffer 10 and a number B of the preforms unloaded from the preform buffer 10 and outputs A-B as the number of the preforms 3 may be disposed.

An unloading outlet 47 for unloading the preforms 3 inside the preform buffer 10 to the second conveying path 15 is formed at a lower end of a front portion of the inner wall of the preform buffer 10.

Also in FIG. 3 and FIG. 4, the second conveying bath 15 includes a first conveying unit 49 by which the preforms 3 piled up in the preform buffer 10 are successively transported upward (lifted up) and a second conveying unit 50 connected to a rear end portion of the first conveying unit 49 and aligning and transporting the lifted-up preforms 3 successively at fixed intervals.

The first conveying unit 49 is arranged from an endless belt conveyor having projections (latching projections 51) for latching the preforms 3 at fixed intervals. The first conveying unit 49 (endless belt conveyor) is installed so as to be inclined diagonally upward with respect to a height position of the unloading outlet 47 of the preform buffer 10 and its front end portion faces the unloading outlet 47. In accompaniment with the operation of the first conveying unit 49, the preforms 3 inside the preform buffer 10 are latched one or several at a time by the latching projections 51 that successively pass across the unloading outlet 47 and are thereby transported diagonally upward.

The second conveying unit 50 is arranged from a suspending transport equipment that transports the preforms 3 in a state of suspending the neck portions 13 of the preforms 3. The second conveying unit 50 has a pair of right and left guide rails 52 for guiding and catching the neck portions 13 of the preforms 3 and the lifted-up preforms 3 are caught one at a time between the pair of guide rails 52 and successively transported at fixed intervals.

In order to mold the preforms 3 by the preform molding machine 6, first, the movable mold 38 is put in the mold-clamped state. The fixed mold 37 and the movable mold 38 are thereby engaged to form the cavities 39. Also, the fan 18 is put in operation to introduce dehumidifying air into the interior of the clean booth 17. The dehumidifying air can thereby be blown onto the cooled and molded preforms 3 to prevent dew condensation on the preforms 3.

Next, the PET resin is loaded into the hopper 25 and while melting the loaded PET resin with the cylinder 28, the resin is fed into the barrelhead 29 by the extruder 30.

Up to a predetermined amount (for example, approximately 29 g×128 bottles) of the fed PET resin is then stored temporarily in the shooting pot 32 by the distributor 31. After storage of the PET resin, the valve mechanism 36 of the distributor 31 is switched to the state of putting the shooting pot 32 and the nozzle 34 in communication, and the PET resin stored in the shooting pot 32 is extruded by the piston 33. The molten PET resin is thereby injected in the horizontal direction from the nozzle 34, passed through the hot runner 40 of the fixed mold 37 while maintaining the molten state, and made to fill the cavities 39 from the respective mold nozzles 43.

After filling, the PET resin inside the cavities 39 is cooled by the movable mold 38 that is controlled, for example, at approximately 7° C.

Thereafter, the movable mold 38 is put in the mold-open state, and the molded preforms 3 move forward along with the movable mold 38 in the state of being attached to the preform, core molds 44. Also in accompaniment, the releasing suction apparatus 24a is slidingly moved and put in the operating state, and the suction inlets 45 of the releasing suction apparatus 24a and the preforms attached to the preform core molds 44 are thereby put in the state of facing each other one-on-one.

By putting the releasing suction apparatus 24a in operation in this state, the preforms 3 are drawn toward the suction inlets 45 and extracted from the preform core molds 44.

In the preform molding machine 6, the above-described step of putting the movable mold 38 in the mold-clamped state to the step of extracting the preforms 3 from the preform core molds 44 are executed as a single batch process (a single shot process of molding 128 preforms 3). This single batch process is executed, for example, in a case of manufacturing 900 ml PET bottles, at a molding rate of molding 400 preforms 3 per 60 seconds, and the molding rate is controlled as suited based on the amount of the preforms 3 in the preform buffer 10.

In molding the preforms 3 by the preform molding machine 6, the preforms 3 that are molded up to a predetermined number of batch processes (for example, the fifth batch process) from the first batch process (at the point of startup of the preform molding machine 6) are often poor in quality and cannot be unloaded by the receiving suction apparatus 24b. Thus, up to the first five shots, the releasing suction apparatus 24a is tilted by 90° so that its front surface faces downward after the preforms 3 have been extracted from the preform core molds 44 and the suction is released. The preforms 3 thereby drop due to gravity and are discarded (purged) from the preform discharging outlet 78 (trial run). As a discarding method besides the above-described method, for example, a method can be cited with which a recovery container is disposed below the mold 23 and the waste (preforms 3) accumulated in the recovery container are discarded upon being brought out to the exterior of the clean booth 17 as an exterior of the aseptic environment meeting predetermined conditions during cleaning of the interior of the clean booth 17 or other time at which a person can enter inside the clean booth 17, etc.

Thereafter from the sixth shot onwards, after the preforms 3 have been extracted from the preform core molds 44, the receiving suction apparatus 24b is moved to the position of the releasing suction apparatus 24a and the suction projections 77 are inserted into the trunk portions 12 of the preforms 3 held in the suction inlets 45. Then from this state, the suction by the releasing suction apparatus 24a is released and suction by the receiving suction apparatus 24b is started so that the preforms 3 are thereby sucked toward the suction projections 77 and the transfer of the preforms 3 from the releasing suction apparatus 24a to the receiving suction apparatus 24b is completed. Thereafter, the receiving suction apparatus 24b is tilted by 90° so that the suction projections 77 face downward and the suction is released so that the preforms 3 in the state of being attached to the suction projections 77 are thereby aligned on the multi-column conveyor 80 and conveyed. While being conveyed, the preforms 3 are cooled by cooling air. The preforms 3 thus harden while being conveyed and deformation of the preforms 3 can be prevented even when the preforms 3 piled up in the preform buffer 10 contact each other. The caps 5 can thus be satisfactorily screwed onto the threaded portions 11 of the preforms 3.

With the present example, it has been empirically shown that the preforms 3 molded by the processes of the sixth shot onwards are still not adequately stable in shape and quality until after a predetermined number of times of processes, and thus the preforms 3 are not placed in the first bucket 82 after being conveyed by the multi-column conveyor 80 but are dropped onto the discharging conveyor 81. After being dropped, the preforms 3 are discarded (purged) from the preform discharging outlet 85 (trial run). This process for the sixth shot to fortieth shot may be omitted depending on the quality of the product.

Meanwhile, the preforms 3 that are molded in the processes after the predetermined number of times of processes are satisfactory products of stable quality and are placed one shot (for example, 128 pieces) at a time into the first bucket 82. The first bucket 82 is then raised and at the raised position, the preforms 3 of one shot are unloaded onto the conveying conveyor 83 at a time. Thereafter, the preforms 3 of one shot that are conveyed by the conveying conveyor 83 are placed in the second bucket 84, and after being slid, the second bucket 84 is lowered into the preform buffer 10 (buffer tank). When the second bucket 84 reaches a vicinity of a peak portion of the preforms 3 piled up in the preform buffer 10, the doors 88 are opened and the preforms 3 of one shot are stored in the preform buffer 10. In this process, the second bucket 84 is lowered to the vicinity of the peak portion of the piled preforms 3 and thus when the doors 88 are opened and the preforms 3 are dropped, impacts of collisions of the dropped preforms 3 with the preforms 3 in the pile can be softened. The preforms 3 can thus be stored with satisfactory quality and without becoming flawed.

The preforms 3 stored in the preform buffer 10 are piled up randomly in the preform buffer 10. Here, the amount piled up in the preform buffer 10 is detected by the amount detection sensor 46 and, based on the detection result, the molding rate of the preform molding machine 6 (see FIG. 2) is adjusted by the controller 16.

The preforms 3 piled up in the preform buffer 10 are successively drawn diagonally upward from the unloading outlet 47 by the first conveying unit 49 and is thereafter aligned one at a time by the second conveying unit 50 and conveyed to the blowing machine 8.

<Blowing Machine 8 and Filling Machine 9>

Figure 5:
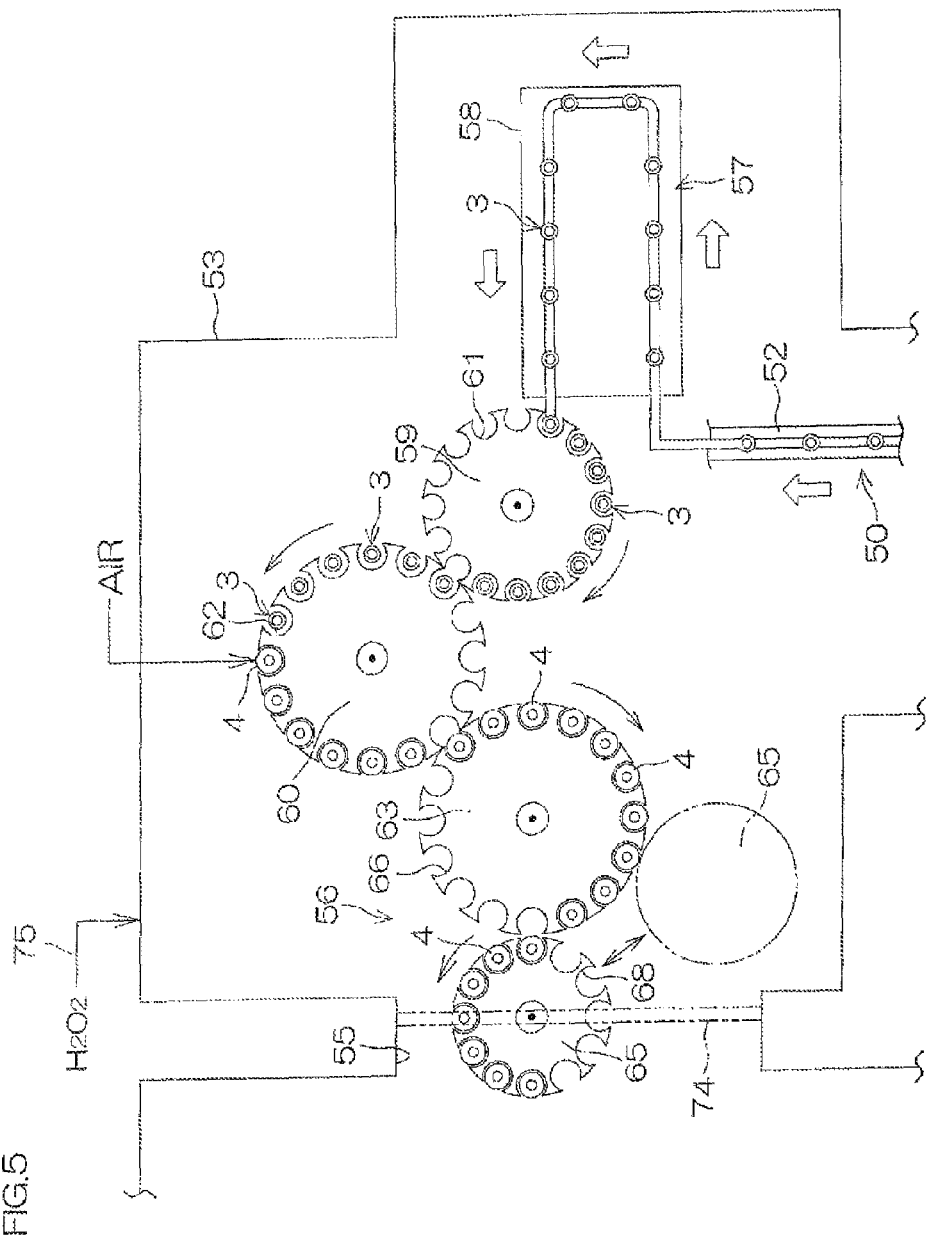
FIG. 5 is a schematic plan view of the blowing machine and is a diagram for explaining a method for bottle forming by the blowing machine.
Figure 6:
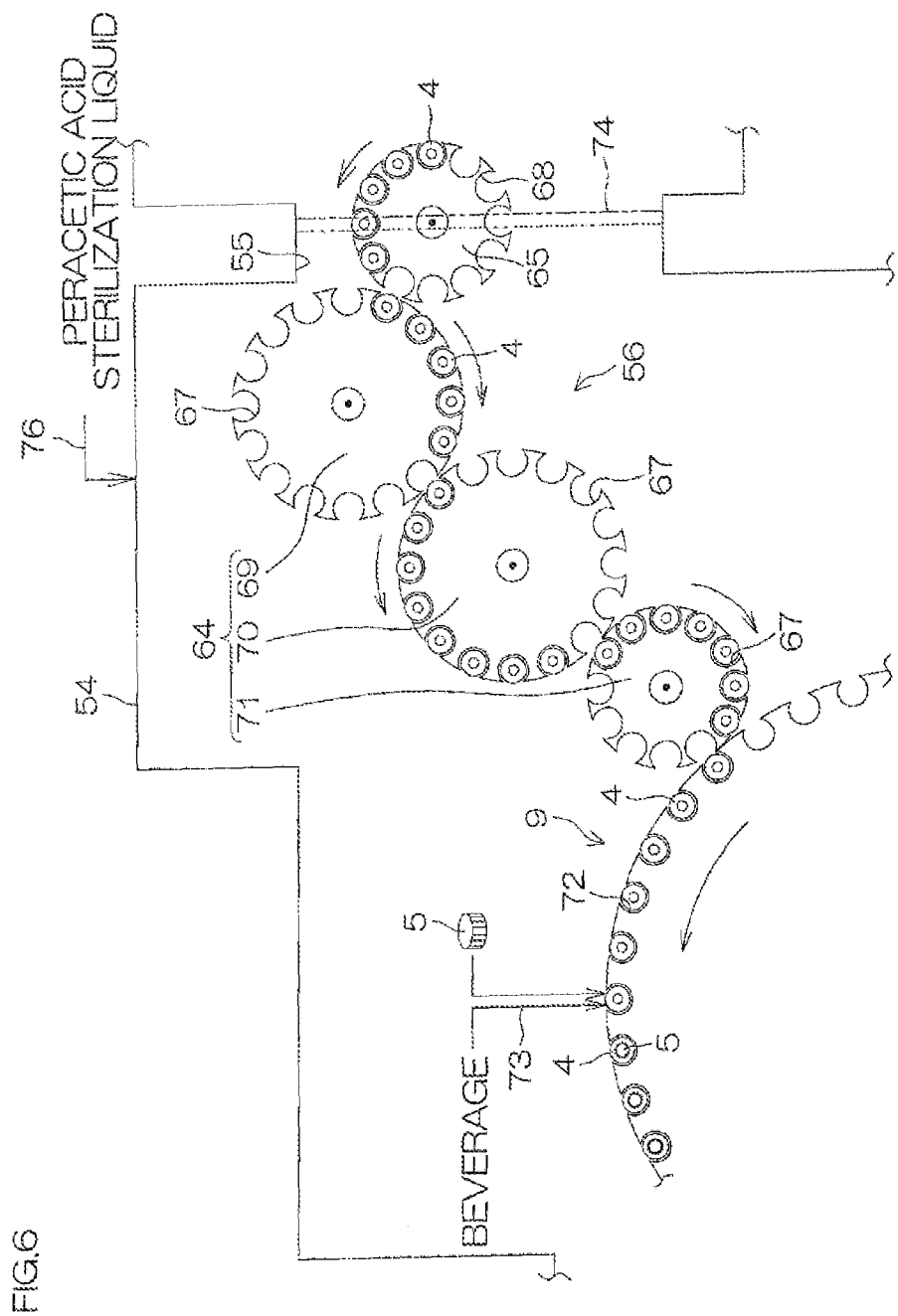
FIG. 6 is a schematic plan view of a filling machine and is a diagram for explaining a method for filling with a beverage by the filling machine.

FIG. 5 is a schematic plan view of the blowing machine and is a diagram for explaining a method for bottle forming by the blowing machine. FIG. 6 is a schematic plan view of a filling machine and is a diagram for explaining a method for filling with a beverage by the filling machine.

In FIG. 5 and FIG. 6, the blowing machine 8 and the filling machine 9 are covered by a blowing machine side case 53 and a filling machine side case 54, respectively, and these cases are connected via a communicating path 55. As the specific coupling structure 7 that integrally couples the blowing machine 8 and the filling machine 9, a plurality of star wheels 56 are disposed at a front and a rear of the communicating path 55 and the blowing machine 8 and the filling machine 9 are coupled by the star wheels 56.

The blowing machine U includes an oven 58, having a conveying path 57 continuous with the second conveying path 15 in its interior, a loading star wheel 59 disposed at an exit of the oven 58 and being for receiving the preforms 3 unloaded from the exit, and a blowing machine main unit 60 as a bottle forming mechanism for forming the preform 3 into bottles.

Recessed portions 61, capable of holding the preforms 3 one by one, are disposed at equal intervals on a circumferential portion of the loading star wheel 59. The preforms 3 exiting from the exit of the oven 58 are successively held one by one by the recessed portions 61 of the rotating loading star wheel 59 and conveyed to the blowing machine main unit 60.

The blowing machine main unit 60 is arranged from a rotary type blowing machine that is capable of forming the bottles while rotating the preforms 3 and has recessed portions 62, engageable with the recessed portions 61 of the loading star wheel 59 and recessed portions 68 (to be described below) of a delivering star wheel 65, at equal intervals on its circumferential portion. A mold (not shown) for forming the preforms 3 one at a time into the bottles is disposed at each recessed portion 62 of the blowing machine main unit 60.

The plurality of star wheels 56 include an unloading star wheel 63 installed in the blowing machine side case 53 and being for taking out the bottles 4 made by the blowing machine main unit 60, a plurality of filling star wheels 64 installed in the filling machine side case 54 and being for supplying the bottles 4 to the filling machine 9, and the delivering star wheel 65 that is displaceable to an operating state (state expressed by solid lines in FIG. 5 and FIG. 6) of being disposed along the communicating path 55 and engaging with the unloading star wheel 63 and the filling star wheel 64 and to a retreated state (state expressed by alternate long and two short dashed lines in FIG. 5) of being detached from the filling star wheel 64, moved into the blowing machine side case 53, and capable of temporarily closing an interval between the unloading star wheel 63 and the filling star wheel 64. The unloading star wheel 63, the filling star wheel 64, and the delivering star wheel 65 respectively have recessed portions 66, 67, and 68, each capable of holding the bottles 4 one at a time, at equal intervals on respective circumferential portions. That the star wheels are engaged refers to a state where, when the recessed portions of mutually adjacent star wheels are made to face each other by rotation of the star wheels, a bottle 4 can be delivered between the mutually facing recessed portions. In the present embodiment, the coupling structure, in which the three star wheels of the unloading star wheel 63, the filling star wheel 64, and the delivering star wheel 65 are disposed to be capable of delivering the bottles 4 among each other, makes up the specific coupling structure 7 that integrates the rotary type blowing machine 8 (blowing machine main unit 60) and the rotary type filling machine 9.

The unloading star wheel 63 is arranged from a wheel of larger diameter than the delivering star wheel 65.

Also, the filling star wheel 54 includes a first wheel 69, a second wheel 70, and a third wheel 71 in that order from a side close to the delivering star wheel 65 and these are installed in a mutually engaged state. The first wheel 69 that is engaged with the delivering star wheel 65 is arranged from a wheel of larger diameter than the delivering star wheel 65 and the second wheel 70 is also arranged from a wheel of the same diameter as the first wheel 69. The third wheel 71 is arranged from a wheel of smaller diameter than the first wheel 69 and the second wheel 70.

The filling machine 9 is arranged from a rotary type filling machine capable of filling the bottles 4 with the beverage while rotating the bottles 4 and has recessed portions 72, capable of engaging with the recessed portions 67 of the third wheel 71, at equal intervals on its circumferential portion Filling lines 73 (of which only one is shown in FIG. 6) for filling the bottles 4 with the beverage are disposed above the respective recessed portions 72 of the filling machine 9.

A shutter 74 for blocking the communicating path 55 is installed in the communication path 55 in a manner enabling sliding in the vertical direction. The communicating path 55 can be blocked by putting the delivering star wheel 65 in the retreated state and lowering the shutter 74. By the blocking of the communicating path 55, flow-through of liquid is prevented between the filling machine 9 plus a side portion (filling machine side case 54) downstream relative to the filling machine 9 in the clean booth 17 and the blowing machine 9 plus a side portion (blowing machine side case 53) upstream relative to the blowing machine 8 in the clean booth 17, and the respective cases can thereby be arranged as respectively independent cases.

Also, an $H_2O_2$ gas supply line 75 for supplying hydrogen peroxide gas ($H_2O_2$ gas) into the blowing machine side case 53 is connected to the blowing machine side case 53, and a peracetic acid disinfectant solution supply line 76 for supplying a peracetic acid disinfectant solution into the filling machine side case 54 is connected to the filling machine side case 54.

The preforms 3 that are conveyed in an aseptic state by the second conveying path 15 shown in FIG. 4 are first heated by the oven 58. $H_2O_2$ gas is supplied into the blowing machine side case 53 in advance that is maintained under an aseptic environment, and the preforms 3 that are unloaded from the oven 58 onto the loading star wheel 59 and held by the recessed portions 61 are disinfected.

The preforms 3 that are heated by the oven 58 and are in a softened state are then fed into the blowing machine main unit 60 via the loading star wheel 59. The preforms 3 are then sandwiched by molds (not shown) provided in the blowing machine main unit 60 and air is blown into the preforms 3 to greatly blow up and form the preforms 3 into bottles.

After bottle forming of the preforms 3, the delivering star wheel 65 is put in the operating state, and the formed bottles 4 are fed from the blowing machine main unit 60 to the filling machine 9 successively via the unloading star wheel 63, the delivering star wheel 65, the first wheel 69, the second wheel 70, and the third wheel 71.

In the filling machine 9, the bottles 4 are filled with the beverage and thereafter, the caps 5 are screwed on. PET-bottled beverages are thereby obtained. The PET-bottled beverages that are obtained are thereafter shipped out upon being labeled as necessary.

The aseptic state of the above-described aseptic filling system 1 can be maintained satisfactorily over a long period by periodically performing a sterilization/disinfection process on the interior of the clean room 2 and the interior of the clean booth 17.

In the sterilization/disinfection process, for example, first, the entire interior of the clean room 2 is disinfected by formalin gas. Then, in a state of blocking the communicating path 55 shown in FIG. 5 and FIG. 6 by the shutter 74, portions in the clean booth 17 at an upstream side relative to the blowing machine 8 are disinfected by gas. Also, the filling machine 9 and portions at a downstream side relative to the filling machine 9 in the clean booth 17 are sterilized/disinfected by peracetic acid. Thereafter, an aseptic environment can be maintained by keeping a room pressure of the clean room 2 at a positive pressure relative to atmospheric pressure to prevent entry of germs, dust, etc., into the clean room 2 as much as possible.

<Actions and Effects>

With the aseptic filling system 1, the step of molding the preforms 3, the step of forming the preforms 3 into bottles, and the step of filling the bottles 4 with the beverage are all performed in the aseptic environment inside the clean room 2 and further inside the clean booth 17. Moreover, the blowing machine 8 and the filling machine 9 are integrated by the coupling structure 7 arranged from the plurality of star wheels 56 and the aseptic state between the blowing machine 8 and the filling machine 9 is maintained satisfactorily. Chemical sterilization/disinfection of the bottles 4 before filling with the beverage is thus not required, a supplementary disinfection by $H_2O_2$ gas suffices, and a chemical usage amount can thus be reduced. Amounts of exposure of the product (PET-bottled beverage) to germs and chemicals can thus be reduced. Consequently, (1) improvement in product quality is possible.

Also, the use of chemicals for sterilization/disinfection can be eliminated to make possible (2) improvement in worker safety. Also, in accompaniment with the disuse of chemicals, an amount of waste (chemical) can be reduced to thus make possible (4) reduction in environmental burdens.

Also, by the blowing machine 8 and the filling machine 9 being integrated, the manufacturing line can be made compact and installation space of the aseptic filling system 1 can be reduced. Consequently, (3) reduction in manufacturing cost (equipment cost) can be achieved. Further, the aseptic filling system 1 is compact and thus the aseptic states of the system as a whole and the respective apparatuses can be managed easily.

Further, the preform buffer 10 is installed and thus even if the preform molding machine 6 stops temporarily due to some problem, etc., the preforms 3 stored in the preform buffer 10 can be conveyed to the second conveying path 15 to continue the aseptic filling without stopping the blowing machine 8 and the filling machine 9 of the post-process.

Also, even when the post-process (blowing machine 8 and/or filling machine 9) stops temporarily due to some problem, etc., the preforms 3 unloaded from the preform molding machine 6 can be stored temporarily in the preform buffer 10. Operation of the preform molding machine 6 can thus be continued without stopping, even while the apparatuses of the post-process are stopped temporarily. When the preform molding machine 6 is stopped temporarily, the molded preforms 3 (resin) may degrade due to scorching, etc. By providing the preform buffer 10, the need to stop the preform molding machine 6 even when the post-process stops temporarily due to a problem is eliminated and improvement in operation rate can thus be achieved.

Moreover, the temporarily stored objects are not the bottles 4 but the preforms 3 and thus an adequate effect can be achieved with a compact buffer tank, etc., and without an increase in equipment cost.

Also, by continuous operation of the preform molding machine 6, the quality of the preforms 3 can be kept uniform and it is thus easy to maintain the quality of the product (PET-bottled beverage). Further, a number of times of restarting of the preform molding machine 6 are decreased and thus a number of times of discarding (trial run) of the preforms 3 of degraded resin can be reduced. Waste (preforms) resulting from the trial run can consequently be reduced to enable reduction in environmental burdens.

Also, the suction apparatus 24 is installed in the preform molding machine 6 and thus the molded preforms 3 attached to the movable mold 38 can be taken out in an automated manner by putting the releasing suction apparatus 24a and the receiving suction apparatus 24h into operation by remote control from outside the clean room 2. Consequently, the aseptic environment of the aseptic filling system 1 can be maintained satisfactorily. Further, such take-out of the preforms 3 can be performed even at the start of molding of the preforms 3, that is, even while the shape and quality of the molded preforms 3 stabilize. That is, the resin that has degraded inside the molds can thus be purged in the preform state without manual intervention. The aseptic environment of the aseptic filling system 1 can thus be maintained even more satisfactorily.

Also, both the blowing machine main unit 60 and the filling machine 9 are rotary type equipments and further, the delivery of the bottles 4 from the blowing machine main unit 60 to the filling machine 9 is performed using the plurality of star wheels 56 having recessed portions capable of holding the bottles 4 one at a time at circumferential portions, and thus in comparison to a case of conveying by suspending neck portions 13 of the bottles 4, the delivery can be performed more reliably and efficiently. Also, the arrangement for coupling and integrating the blowing machine 8 and the filling machine 9 can be realized in, a space-saving manner that is high in degree of freedom of design.

Other Embodiments of the Preform Buffer

Figure 7:
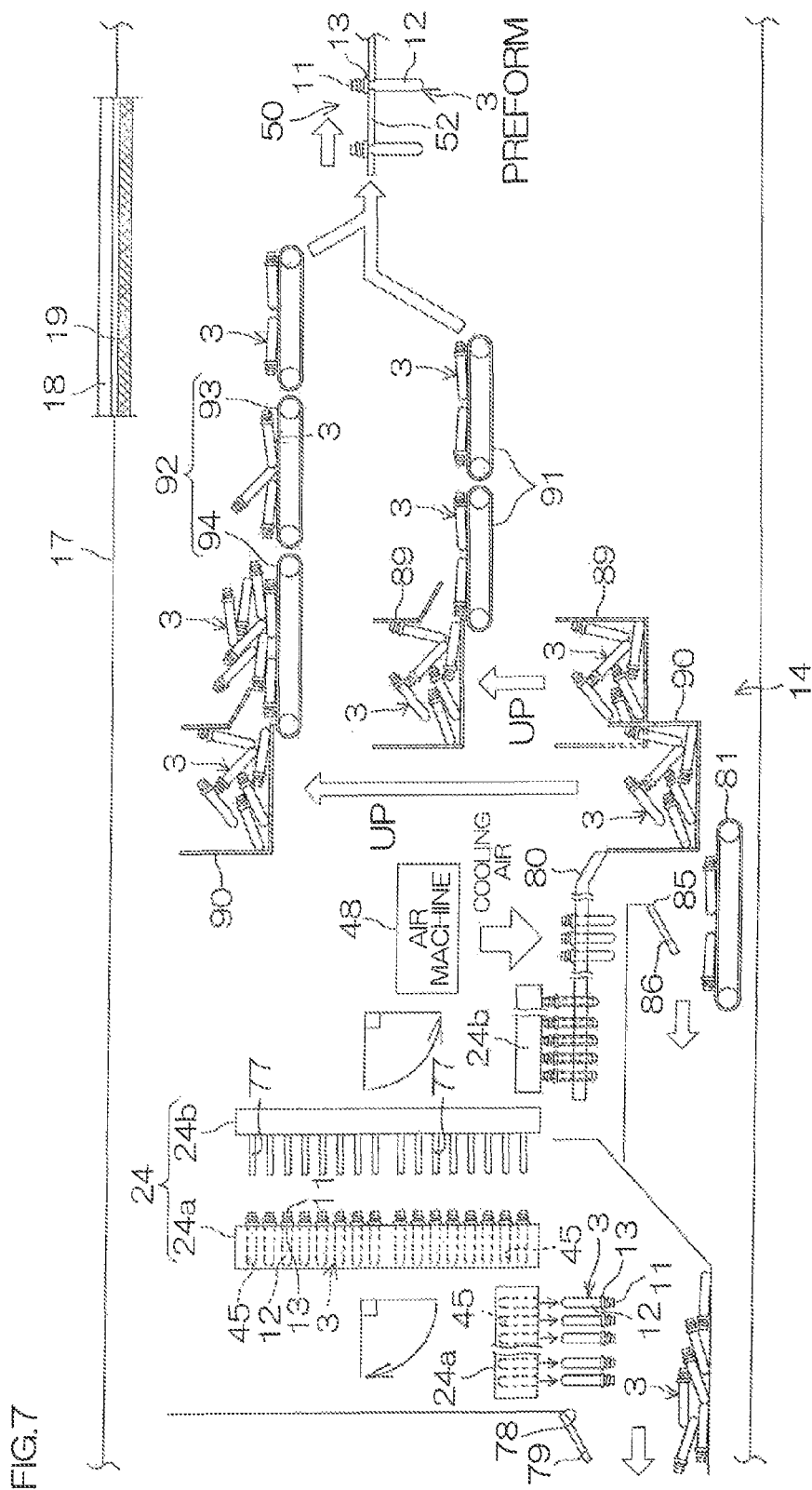
FIG. 7 is a diagram for explaining another embodiment of the preform buffer and is a schematic side view of principal portions of an aseptic filling system.
Figure 8:
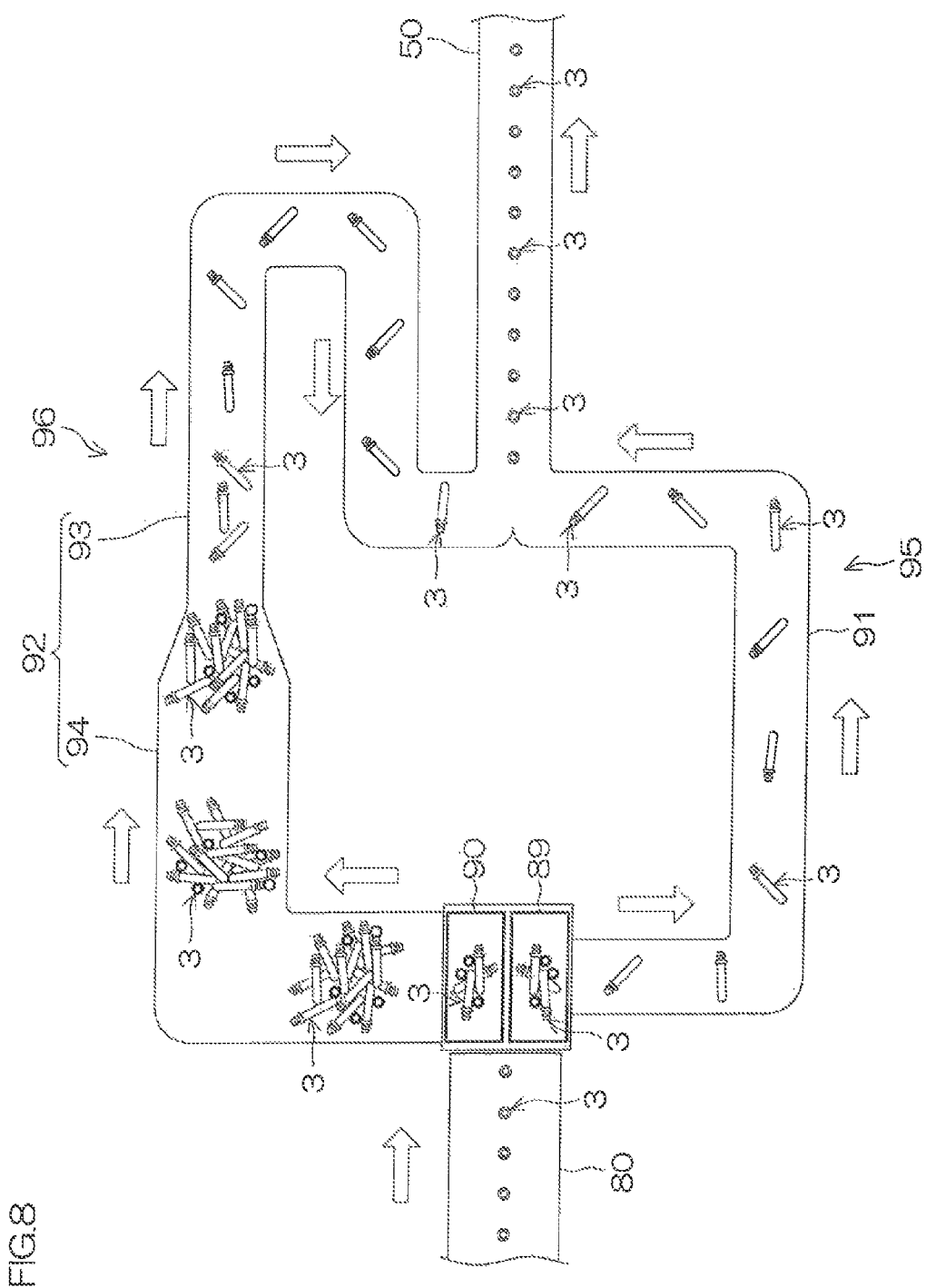
FIG. 8 is a diagram for explaining another embodiment of the preform buffer and is a schematic plan view of principal portions of the aseptic filling system.

FIG. 7 is a diagram for explaining another embodiment of the preform buffer and is a schematic side view of principal portions of an aseptic filling system. FIG. 8 is a diagram for explaining another embodiment of the preform buffer and is a schematic plan view, of principal portions of the aseptic filling system. In FIG. 7 and FIG. 8, portions corresponding to respective portions shown in FIG. 1 to FIG. 4 are provided with the same reference symbols as the respective portions. In the following description, detailed description of portions provided with the same reference symbols shall be omitted.

With the above-described embodiment, the preform buffer 10 for temporarily storing the preforms 3 molded by the preform molding machine 6 is arranged from the buffer tank in which the preforms 3 are stored in a randomly piled manner. However, the preform buffer may be arranged from a belt conveyor as shown in FIG. 7 and FIG. 8 as long as the arrangement provides an action of buffering a rate difference between a processing rate of the process preceding the preform buffer 10 and a processing rate of the post-process.

Specifically, in the present embodiment, the preform buffer 10, the first bucket 82, the conveying conveyor 83, the second bucket 84, and the first conveying unit 49 are omitted.

In place of the omitted equipment, a third bucket 89 that receives the preforms 3 from the multi-column conveyor 80 during normal operation (when there is no problem in the post-process), a fourth bucket 90 that receives the preforms 3 from the multi-column conveyor 80 when a problem occurs in the post process, a first conveyor 91 that receives the preforms 3 from the third bucket 89 and conveys the preforms 3 to the second conveying unit 50, and a second conveyor 92 that receives the preforms 3 from the fourth bucket 90 and conveys the preforms 3 to the second conveying unit 50 are provided in the present embodiment.

As with the first bucket 82, the third bucket 89 is also arranged from a raised/lowered bucket and is raised and lowered freely in the vertical direction between a lowered position of receiving the preforms 3 from the multi-column conveyor 80 and a raised position of feeding the received preforms 3 to the first conveyor 91. The third bucket 89 has a capacity capable of housing a single shot of (for example, 128) preforms 3 at the lowered position.

As with the first bucket 82, the fourth bucket 90 is also arranged from a raised/lowered bucket and is raised and lowered freely in the vertical, direction between a lowered position of receiving the preforms 3 from the multi-column conveyor 80 and a raised position of feeding the received preforms 3 to the second conveyor 92. The fourth bucket 90 has a capacity capable of housing a single shot of (for example, 128) preforms 3 at the lowered position.

The first conveyor 91 (normal state conveying conveyor) is arranged from a combination of a plurality of endless belt conveyors with a starting end portion being connected to the raised position of the third bucket 89 and a terminal end portion thereof being connected to the second conveying unit 50. By the first conveyor 91, the preforms 3 fed from the third bucket 89 are successively conveyed one at a time to the second conveying unit 50.

The second conveyor 92 (problem state conveying conveyor) includes a belt (conveying conveyor 93) of relatively narrow width with a terminal end portion connected to the second conveying unit 50 and a belt (buffering conveyor 94) of relatively wide width that connects the raised position of the fourth bucket 90 with a starting end portion of the conveying conveyor 93.

The conveying conveyor 93 is arranged from a combination of a plurality of endless belt conveyors of substantially the same length and same width as the first conveyor 91. Thus, under the same conveying rate condition, the conveying conveyor 93 and the first conveyor 91 can convey the same amount of the preforms 3 per unit time (are the same in conveying ability).

The buffering conveyor 94 is arranged from an endless belt that is separated from the conveying conveyor 93 and its conveying rate is controlled independently of the conveying conveyor 93. The buffering conveyor 94 has a belt width enabling the preforms 3 of a single shot fed from the fourth bucket 90 to be conveyed in a piled-up state. It is designed, for example, so that the preforms 3 are not supplied to the blowing machine 8 for approximately 30 minutes (maximum of 6.0 minutes).

With the present embodiment, a conveying route (buffer route 96) that differs from a route (normal route 95) passing through the first conveyor 91 is provided. In the buffer route 96, the buffering conveyor 94, the rate of which is controlled independently of the conveying conveyor 93, is installed between the raised position of the fourth bucket 90 and the conveying conveyor 93.

Thus, when the post-process (blowing machine 8 and/or filling machine 9) stops temporarily due to some problem, etc., the preforms 3 conveyed along the multi-column conveyor 80 are placed in the fourth bucket 90 to switch the conveying route of the preforms 3 from the normal route 95 to the buffer route 96. The buffering conveyor 94 thus provides extra time until the preforms 3 housed in the fourth bucket 90 enter the conveying conveyor 93 that has the same conveying ability as the first conveyor 91. Operation of the preform molding machine 6 can thus be continued without stopping even while the apparatuses of the post-process are stopped temporarily. The pile of preforms 3 on the buffering conveyor 94 is broken down by making use of the conveyor widths of the buffering conveyor 94 and the conveying conveyor 93 and the preforms 3 are thereby conveyed one at a time by the conveying conveyor 93.

Although embodiments of the present invention have been described above, the present invention may be put into practice in other modes as well.

For example, the unit for removing the preforms 3 from the mold 23 of the preform molding machine 6 is not restricted to the suction apparatus 24 that performs removal by suction as in the above-described embodiments and may, for example, be a mechanism that grasps and removes the preforms 3 attached to the mold 23.

Also, the preform buffer 10 for temporarily storing the preforms 3 molded by the preform molding machine 6 is not restricted to the buffer tank or the buffering conveyor 94 in which the preforms 3 are stored in a randomly piled state as in the above-described embodiments and may instead be an arrangement in which the multi-column conveyor 80 is made long to enable some extra time to be provided until the preforms 3 reach the second conveying path 15 from the preform molding machine 6.

Also, the resin used is not restricted to PET resin and may be changed as suited according to the application.

Also, the amount of the preforms 3 stored in the preform buffer 10 may be judged by detecting the amount of the preforms 3 as in the above-described embodiments or may be judged by detecting the number of preforms 3. In order to detect the number of the preforms 3, for example, the number molded by the preform molding machine 6 is subtracted from the number of the PET-bottled beverages produced (here, losses occurring in intermediate processes are taken into consideration).

Sports drinks, mineral water, black tea, carbonated beverages, and other refreshing beverages can be cited as examples of the beverage filled by the aseptic filling system 1 according to the present invention.

The embodiments of the present invention are merely specific examples illustrative of the technical principles of the present invention, the present invention should not be interpreted as being limited to these specific examples, and the spirit and scope of the present invention are to be only by the appended claims.

Also, the components described in the respective embodiments of the present invention may be combined within the scope of the present invention.

This application corresponds to Japanese Patent Application No. 2010-119438, filed with the Japan Patent Office on May 25, 2010, the entire disclosure of which is incorporated herein by reference.

DESCRIPTION OF THE SYMBOLS

1 . . . aseptic filling system, 2 . . . clean room, 3 . . . preform, 4 . . . bottle, 6 . . . preform molding machine, 7 . . . coupling structure, 8 . . . blowing machine, 9 . . . filling machine, 10 . . . preform buffer, 14 . . . first conveying path, 15 . . . second conveying path, 16 . . . controller, 17 . . . clean booth, 18 . . . fan, 19 . . . filter, 20 . . . exhaust window, 23 . . . mold, 24 . . . suction apparatus, 37 . . . fixed mold, 38 . . . movable mold, 46 . . . amount detection sensor, 48 . . . blower, 55 . . . communicating path, 56 . . . plurality of star wheels, 58 . . . oven, 60 . . . blowing machine main unit, 63 . . . unloading star wheel, 64 . . . filling star wheel, 65 . . . delivering star wheel, 74 . . . shutter, 94 . . . buffering conveyor

What is claimed is:

1. An aseptic filling system disposed in an aseptic environment and performing molding of preforms, bottle forming, and filling of bottles with a beverage in an aseptic state, the aseptic filling system comprising:
a preform molding machine;
a blowing machine for forming bottles by blowing up the preforms molded by the preform molding machine; and
a filling machine for filling the bottles formed by the blowing machine with the beverage, wherein
the blowing machine and the filling machine are integrated with each other by a plurality of star wheels that are rotatable and capable of holding the bottles at a circumferential portion thereof, and
the bottles formed by the blowing machine are fed to the filling machine successively via the plurality of star wheels,
wherein the plurality of star wheels comprises:
an unloading star wheel for taking out the bottles formed by the blowing machine; and
a filling star wheel for supplying the bottles to the filling machine; and
a delivering star wheel for delivering the bottles, held by the unloading star wheel, to the filling star wheel is disposed between the unloading star wheel and the filling star wheel, and
wherein the delivering star wheel is configured to be changed in position to an operating state of engaging with the unloading star wheel and the filling star wheel and to a retreated state of temporarily being able to block an interval of latching between the unloading star wheel and the filling star wheel by moving away from at least any of the wheels.

2. The aseptic filling system according to claim 1, wherein the preform molding machine comprises an injection molding machine that performs batch-wise injection molding while melting a resin continuously,
the injection molding machine includes molds comprising at least bipartite members that are closed during injection molding and opened up when taking out the preforms and a removing unit removing and unloading the preforms attached to one of the molds to a predetermined position when the molds are opened, and
the molds and the removing unit are disposed inside an aseptic environment meeting predetermined conditions.

3. The aseptic filling system according to claim 2, wherein at a start of injection molding by the injection molding machine, the batch-wise injection molding is performed just a predetermined number of times to form the preforms and the molded preforms are taken out by the removing unit and unloaded out of the aseptic environment meeting predetermined conditions.

4. The aseptic filling system according to claim 1, wherein the blowing machine comprises: an oven for heating the conveyed preforms to a predetermined temperature; and
a bottle-forming mechanism blowing up and forming the preforms heated by the oven into bottles.

5. The aseptic filling system according to claim 1, further comprising:
a shutter unit temporarily closing a communicating path between the blowing machine and the filling machine when the delivering star wheel is in the retreated state, and
wherein in the state where the shutter unit is closed, a side of the blowing machine can be sterilized using a non-aqueous method, and
a side of the filling machine can be sterilized using an aqueous method.

6. The aseptic filling system according to claim 1, wherein the preform molding machine, the blowing machine, and the filling machine are covered by a clean booth that demarcates an aseptic environment in its interior, and the interior of the clean booth is set at a pressure higher than an exterior pressure of the clean booth.

7. The aseptic filling system according to claim 6, wherein the clean booth covering the respective equipment has, on an upper surface thereof, a fan for sucking in air from the exterior of the clean booth and the clean booth has HEPA filters or ULPA filters aligned at predetermined intervals for filtering the air sucked in by the fan, and
the clean booth has, on a lower surface side thereof, an exhaust window through which the air inside the clean booth is exhausted.

8. The aseptic filling system according to claim 7, wherein the clean booth covering the respective equipment is further disposed inside an aseptic environment of a predetermined degree of cleanness.

9. The aseptic filling system according to claim 1, wherein the blowing machine is arranged from a rotary type blowing machine that is capable of forming the bottles while rotating the preforms, the rotary type blowing machine being engaged with the plurality of star wheels to be integrated with the same, and
the filling machine is arranged from a rotary type filling machine capable of filling the bottles with the beverage while rotating the bottles, the rotary type filling machine being engaged with the plurality of star wheels to be integrated with the same.

10. An aseptic filling system disposed in an aseptic environment and performing molding of preforms, bottle forming, and filling of bottles with a beverage in an aseptic state, the aseptic filling system comprising:
a preform molding machine;
a preform buffer for temporarily storing the preforms molded by the preform molding machine;
a blowing machine for forming bottles by blowing up the preforms; and
a filling machine for filling the bottles formed by the blowing machine with the beverage, wherein
the blowing machine and the filling machine are integrated with each other by a plurality of star wheels that are rotatable and capable of holding the bottles at a circumferential portion thereof, and
the bottles formed by the blowing machine are fed to the filling machine successively via the plurality of star wheels,
wherein the plurality of star wheels comprises:
an unloading star wheel for taking out the bottles formed by the blowing machine; and
a filling star wheel for supplying the bottles to the filling machine; and
a delivering star wheel for delivering the bottles, held by the unloading star wheel, to the filling star wheel is disposed between the unloading star wheel and the filling star wheel, and
wherein the delivering star wheel is configured to be changed in position to an operating state of engaging with the unloading star wheel and the filling star wheel and to a retreated state of temporarily being able to block an interval of latching between the unloading star wheel and the filling star wheel by moving away from at least any of the wheels.

11. The aseptic filling system according to claim 10, wherein
the preform molding machine comprises an injection molding machine that performs batch-wise injection molding while melting a resin continuously,
the injection molding machine includes molds comprising at least bipartite members that are closed during injection molding and opened when taking out the preforms and a removing unit removing and unloading the preforms attached to one of the molds to a predetermined position when the molds are opened, and
a conveying path is provided at the predetermined position where the removing unit removes and unloads, the conveying path successively conveys the preforms to the preform buffer, and the preforms are cooled by air while being conveyed.

12. The aseptic filling system according to claim 10, wherein
the preform buffer is set to a capacity for temporarily storing the preforms supplied to the blowing machine for filling the bottles manufactured by the system with the beverage.

13. The aseptic filling system according to claim 12, wherein
the preform buffer comprises a buffer tank for storing a predetermined number of the preforms.

14. The aseptic filling system according to claim 12, wherein
the preform buffer comprises a buffering belt for placement and conveying of a predetermined number of the preforms.

15. The aseptic filling system according to claim 10, further comprising:
a detecting unit detecting an amount or a number of the preforms temporarily stored in the preform buffer; and
a molding rate controlling unit adjusting a molding rate of the preform molding machine based on the amount or the number of the preforms detected by the detecting unit.

16. The aseptic filling system according to claim 10, further comprising:
an aseptic conveying unit disposed between the preform buffer and the blowing machine for conveying the preforms, unloaded from the preform buffer, to the blowing machine.

17. The aseptic filling system according to claim 10, wherein
the preform buffer is also covered with a clean booth, and the interior of the clean booth is set at a pressure higher in air than an exterior pressure of the clean booth.

18. The aseptic filling system according to claim 10, wherein
the preform molding machine comprises an injection molding machine that performs batch-wise injection molding while melting a resin continuously,
the injection molding machine includes molds comprising at least bipartite members that are closed during injection molding and opened up when taking out the preforms and a removing unit removing and unloading the preforms attached to one of the molds to a predetermined position when the molds are opened, and
the molds and the removing unit are disposed inside an aseptic environment meeting predetermined conditions.

* * * * *